(12) United States Patent
Chiu et al.

(10) Patent No.: US 7,768,503 B2
(45) Date of Patent: Aug. 3, 2010

(54) CAPACITIVE TOUCHPAD INTEGRATED WITH A GRAPHICAL INPUT FUNCTION

(75) Inventors: Yen-Chang Chiu, Linkou Shiang (TW); Yung-Lieh Chien, Taoyuan (TW)

(73) Assignee: Elan Microelectronics Corporation, Hsinchu (TW)

( * ) Notice: Subject to any disclaimer, the term of this patent is extended or adjusted under 35 U.S.C. 154(b) by 990 days.

(21) Appl. No.: 11/130,108

(22) Filed: May 17, 2005

(65) Prior Publication Data

US 2005/0259086 A1   Nov. 24, 2005

(30) Foreign Application Priority Data

May 20, 2004   (TW) .............................. 93114291 A

(51) Int. Cl.
 *G09G 5/00* (2006.01)
(52) U.S. Cl. ..................... 345/173; 345/156; 455/466
(58) Field of Classification Search .............. 345/156, 345/173–178; 455/466; 379/90.01
See application file for complete search history.

(56) References Cited

U.S. PATENT DOCUMENTS

| | | | | |
|---|---|---|---|---|
| 6,947,033 B2 * | 9/2005 | Fåhraeus et al. ............ 345/175 |
| 7,003,308 B1 * | 2/2006 | Fuoss et al. ................. 455/466 |
| 7,224,991 B1 * | 5/2007 | Fuoss et al. ................. 455/466 |
| 7,274,353 B2 * | 9/2007 | Chiu et al. ................... 345/156 |
| 2003/0016253 A1 * | 1/2003 | Aoki et al. ................... 345/863 |
| 2004/0196270 A1 * | 10/2004 | Chiu et al. ................... 345/174 |
| 2005/0129199 A1 * | 6/2005 | Abe ........................ 379/90.01 |
| 2005/0179672 A1 * | 8/2005 | Chiu et al. ................... 345/173 |

* cited by examiner

*Primary Examiner*—Henry N Tran
*Assistant Examiner*—Viet Pham
(74) *Attorney, Agent, or Firm*—Rosenberg, Klein & Lee

(57) ABSTRACT

A capacitive touchpad provides operational modes including key input, graphical input, handwriting input, and mouse control. The touchpad comprises a panel having several programmed regions thereon, several patterns in the regions are programmed for the operational modes, and a pattern on the panel is programmed as a mode switch to switch the touchpad between the operational modes. In the graphical input mode, the regions include a graphical input region for graphical input. In the key input mode, the patterns include ones for keys to simulate a keyboard. In the handwriting input mode, the regions include a handwriting region for handwriting input. In the mouse control mode, the regions include a cursor control region as well as horizontal and vertical scroll regions.

12 Claims, 8 Drawing Sheets

CAPACITIVE TOUCHPAD INTEGRATED WITH A GRAPHICAL INPUT FUNCTION

FIELD OF THE INVENTION

The present invention is related generally to a capacitive touchpad and more particularly, to a capacitive touchpad integrated with a graphical input function.

BACKGROUND OF THE INVENTION

Touchpads have been well known and widely used in various electronic products. A touchpad could serve as a simple, light and low-cost pointing device, such as one in a notebook for mouse control. FIG. 5 shows a perspective diagram for illustrating the operational principles of a capacitive touchpad, which comprises an insulation plate 48, a ground plane 36, a layer of Y trace 38, and a layer of X trace 40, and the later three are all coupled to a control circuit 46. An equivalent capacitor 42 exists between a Y trace 38 and the ground plane 36, and an equivalent capacitor 44 exists between an X trace 40 and the ground plane 36. When a finger or a conductive object touches on the insulation plate 48, upon the instant capacitance variation resulted therefrom, the control circuit 46 could determine the location of the finger or conductive object and a further processing accordingly.

Currently, there are three types of touchpad, i.e., resistive touchpad, electromagnetic touchpad, and capacitive touchpad. The capacitive touchpad has been applied in Internet public telephone and guiding system, but not provided with the functions of graphical input and handwriting input. The resistive touchpad has been applied in personal digital assistant (PDA) and electronic dictionary for example, but incapable of acquiring an input with fingers lightly touching thereon. Current tablet PC and electronic schoolbag are equipped with touchpad having handwriting input and key input functions integrated together, but only the resistive and electromagnetic touchpads are available for those applications. However, the resistive touchpad requires a concentrated pressing point for input thereon and thus is readily wear out, and the electromagnetic touchpad requires a special and battery-powered input pen for operations therewith.

In view of performance and cost, the capacitive touchpad is evidently superior to the resistive and electromagnetic touchpads. The operational principles of the capacitive touchpad reside in that an instant capacitance effect resulted from the touch of a finger or a conductive object on the touchpad is used to determine the touching location. Unlike the electromagnetic touchpad, the capacitive touchpad does not need to be operated with the aid of a power-consuming input pen, and the capacitive touchpad has a longer lifetime than the resistive touchpad, since there is no need for a concentrated pressing point thereon for input. Additionally, the capacitive touchpad has simpler construction, less elements and higher yield rate, and therefore the cost for mass production is lower.

On the other hand, for current electronic products, a newly developing trend is towards graphical input, and the need therefor is popularizing and growing. For example, the short message service (SMS) on mobile phone system has transited from text-only to text and graphics combined. Therefore, it is desired a touchpad having smaller volume, lower cost, and easier manipulation, and integrated with a graphical input function.

SUMMARY OF THE INVENTION

One object of the present invention is to provide a capacitive touchpad integrated with a graphical input function.

A capacitive touchpad according to the present invention provides several operational modes that may includes a key input function, a graphical input function, a handwriting input function, and a mouse control function. The capacitive touchpad comprises a panel on which several regions are programmed for the operational modes, and several patterns in the regions are programmed for the operations. A pattern on the panel is programmed as a mode switch to switch the capacitive touchpad between the operational modes. In the graphical input mode, the programmed regions include a graphical input region for graphical input. In the key input mode, the patterns include ones for keys to simulate a keyboard. In the handwriting input mode, the programmed regions include a handwriting region for handwriting input. In the mouse control mode, the programmed regions include a cursor control region as well as horizontal and vertical scroll regions.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
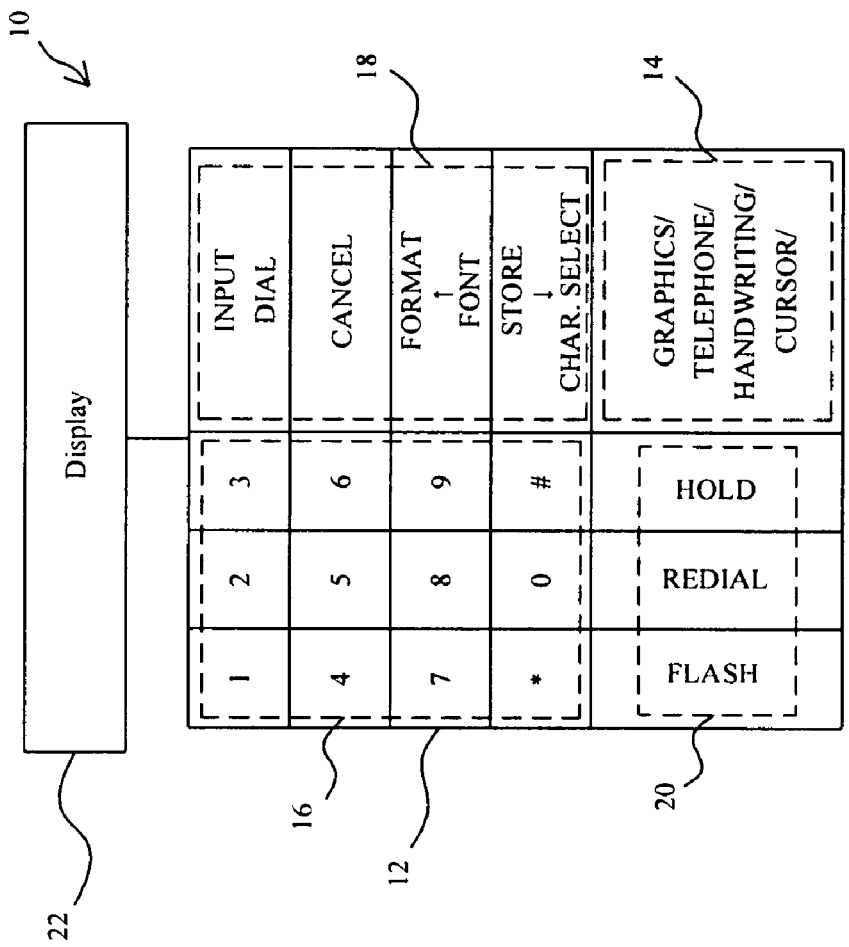
FIG. 1 shows a perspective diagram of a capacitive touchpad according to the present invention.

FIG. 1 shows a perspective diagram of an embodiment according to the present invention. A capacitive touchpad 10 comprises a panel 12 to be touched by fingers or conductive objects for input operations. On the panel 12, a pattern 14 is programmed as a mode switch to be touched to switch the capacitive touchpad 10 between a graphical input mode, a key input mode, a handwriting input mode, and a mouse control mode, and several regions 16, 18 and 20 are programmed for the input operations in the various operational modes. A display 22 is further coupled to the panel 12 to display the data inputted on the operational regions 16, 18 and 20, or the current operational mode.

Figure 1A:
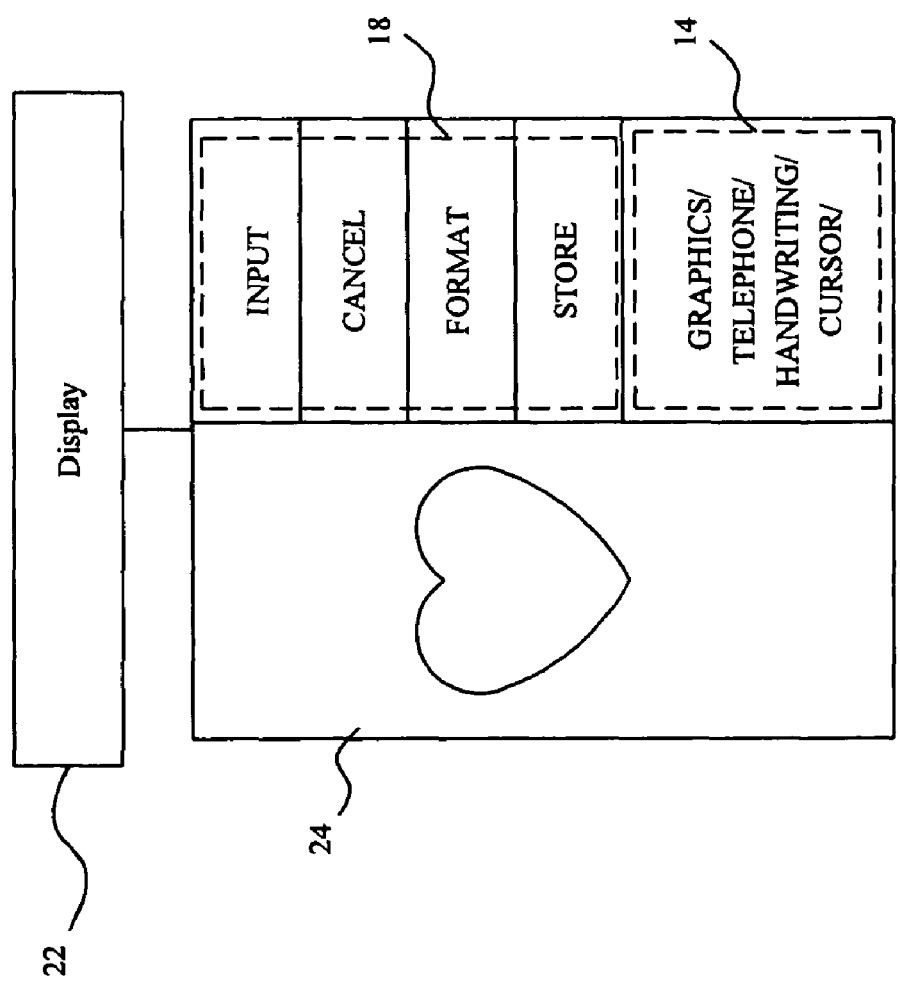
FIG. 1A shows a perspective diagram of the capacitive touchpad in FIG. 1 under a graphical input mode.

When the capacitive touchpad 10 is switched to the graphical input mode, the regions 16 and 20 become a graphical input region 24, as shown in FIG. 1A, and in combination with the patterns INPUT, CANCEL, FORMAT, and STORE in the region 18 for the commands of input, cancel, format and store, the graphical input is carried out. In this mode, the user could draw graphics on the region 24 by fingers or conductive objects, the graphics inputted on the region 24 may be displayed on the display 22, and edited by operating on the region 24 and sent out to a host.

Figure 1B:
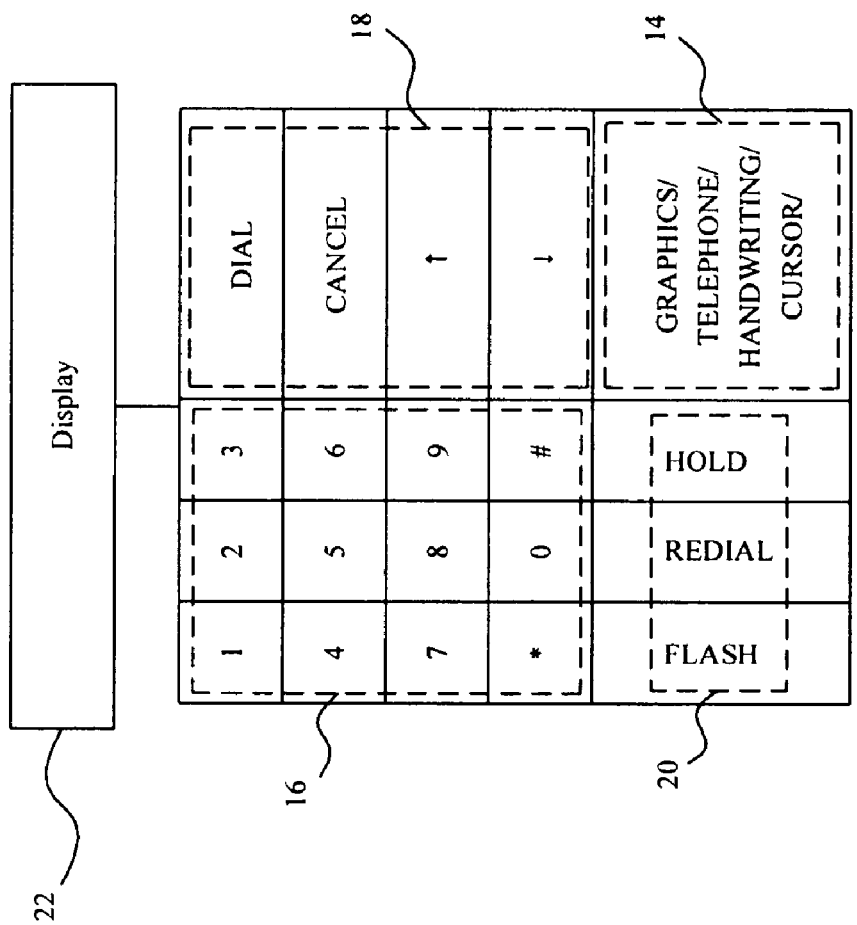
FIG. 1B shows a perspective diagram of the capacitive touchpad in FIG. 1 under a key input mode.

When the capacitive touchpad 10 is switched to the key input mode, as shown in FIG. 1B, the patterns of numeric, '#' and '*' in the region 16, the patterns of DIAL, CANCEL and upward as well as downward arrows in the region 18, and the patterns of FLASH, REDIAL and HOLD in the region 20, are used to serve as a keyboard for a telephone. With this virtual keyboard implemented by the panel 12, the user could dial up telephone numbers by touching the respective patterns on the panel 12, and the inputted telephone numbers may be displayed on the display 22 and sent out.

Figure 1C:
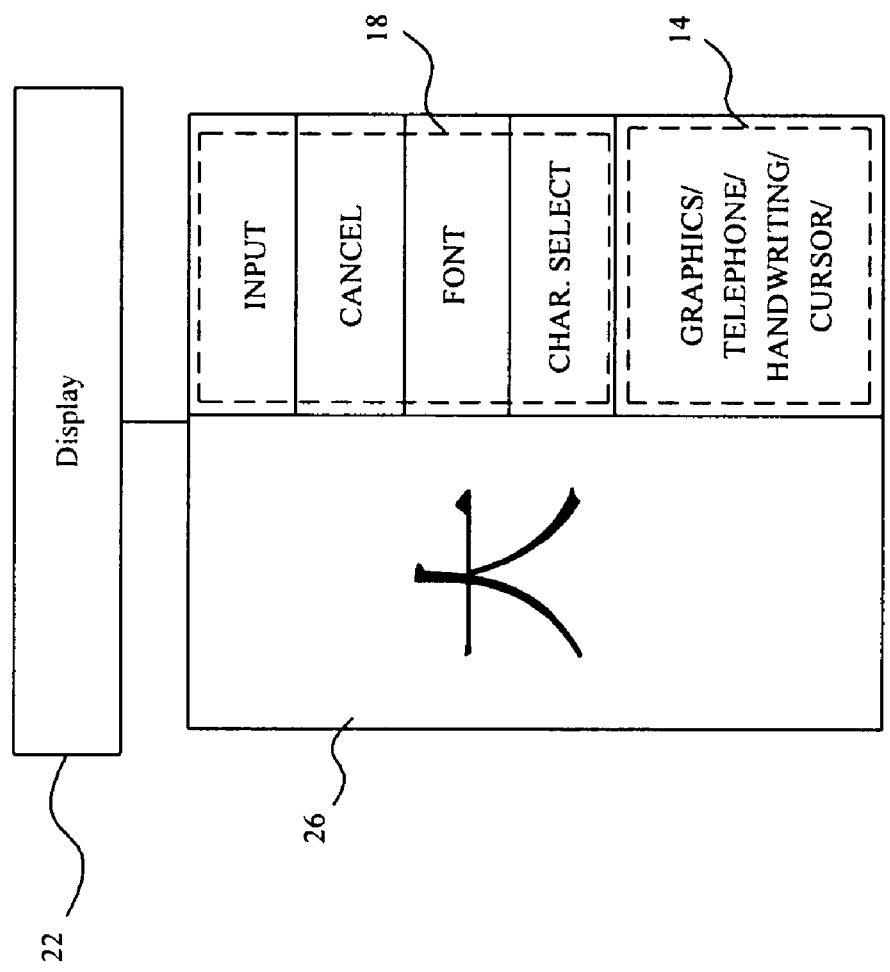
FIG. 1C shows a perspective diagram of the capacitive touchpad in FIG. 1 under a handwriting input mode.

When the capacitive touchpad 10 is switched to the handwriting input mode, the regions 16 and 20 become a handwriting region 26, as shown in FIG. 1C, and in combination with the patterns INPUT, CANCEL, FONT and CHAR. SELECT in the region 18 for input, undo, and font and character selection, the user may operate for handwriting input. By writing on the handwriting region 26 with fingers or conductive objects, and with the aid of software or hardware for trace identification, the handwritten input such as words, numbers and symbols may be displayed on the display 22.

Significant difference is presented between the handwriting input mode and the graphical input mode. In the handwriting input mode, when the user stops to write on the handwriting region 26 for a while, the recognition module of the system will automatically recognize the trace on the handwriting region 26 for the input, and the response time to determine the handwriting input may be adjusted upon the user's request. While in the graphical input mode, it is a command issued by the user to complete the graphical input and to send out the inputted graphics to the system.

Figure 1D:
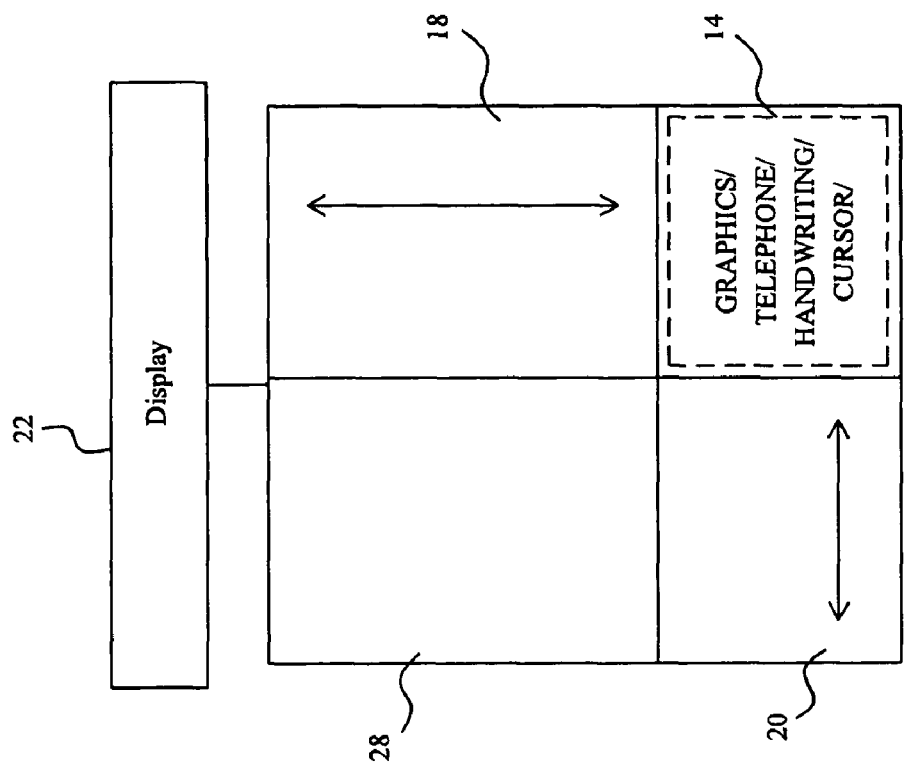
FIG. 1D shows a perspective diagram of the capacitive touchpad in FIG. 1 under a mouse control mode.

As the capacitive touchpad 10 is switched to the mouse control mode, as shown in FIG. 1D, the region 16 becomes a cursor control region 28 on which the user may control the movement of the cursor on a window, the region 18 becomes a vertical scroll region, and the region 20 becomes a horizontal scroll region. The vertical and horizontal roll regions 18 and 20 are used to control the scroll bars on a window, for example on a Microsoft Office application.

Moreover, another recognition module may be added to the system to identify the number of fingers touching on the cursor control region 28, to accordingly give various commands upon the number of fingers. For instance, with the determination of the recognition module to the finger number, a touching of two fingers on the panel 12 represents a click on the left button of a mouse, and a touching of three fingers on the panel 12 represents a click on the right button of a mouse.

Figure 2:
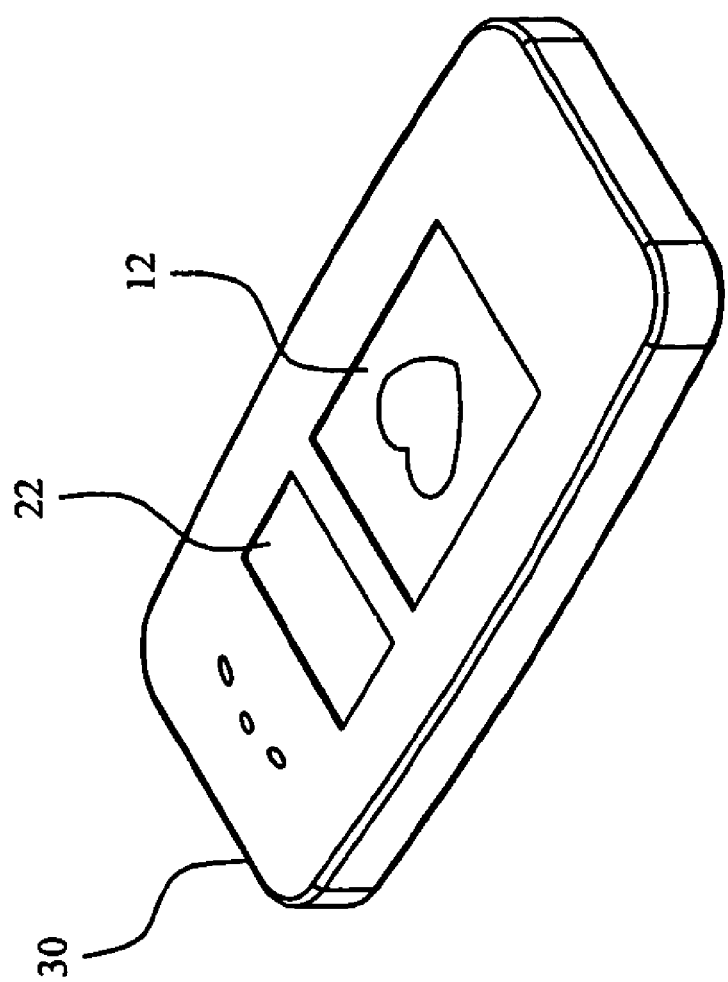
FIG. 2 shows a perspective diagram of a capacitive touchpad applied in a mobile phone according to the present invention.

FIG. 2 shows a perspective diagram of the capacitive touchpad 10 applied in a mobile phone 30, on which, by operating on the panel 12 as shown in FIGS. 1A-1D, various input modes may be achieved. To switch between the various input modes, the user only needs to touch on the pattern representative of the mode switch. For example, after completing an input including text and graphics on the panel 12, the user may switch the touchpad to the handwriting input mode to name and store a file for the input. In the handwriting input mode, by writing a filename on the panel 12, the user may call the stored file to edit and use. In addition to have the mobile phone 30 dramatically thinner in thickness, a significant improvement to the input functions is also obtained for the mobile phone 30. Furthermore, in terms of the cost, it is relatively cheaper than a key module in a conventional mobile phone.

Figure 4:
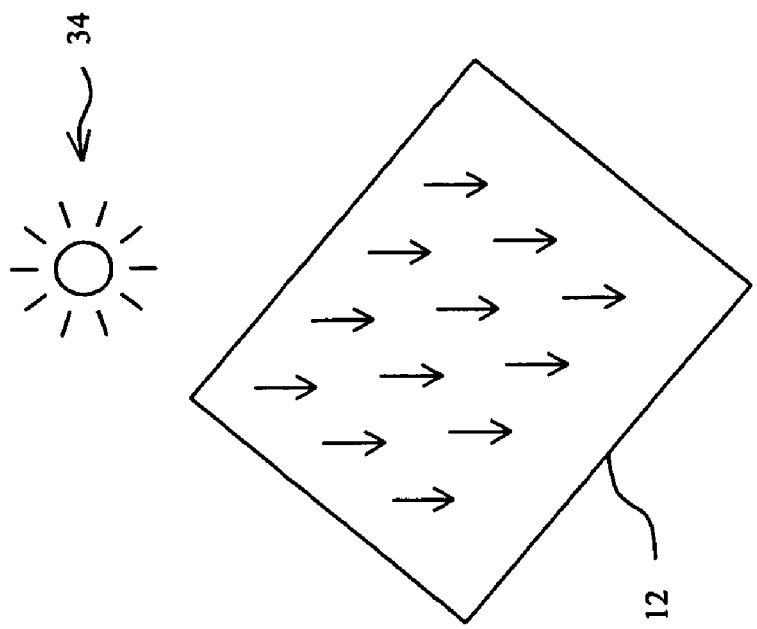
FIG. 4 shows a perspective diagram of a capacitive touchpad equipped with a frontlight source according to the present invention.
Figure 3:
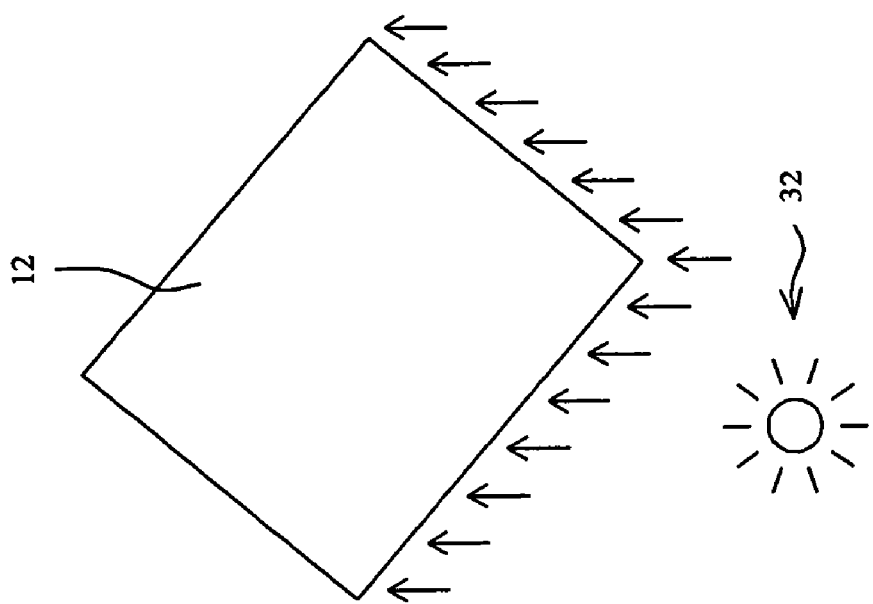
FIG. 3 shows a perspective diagram of a capacitive touchpad equipped with a backlight source according to the present invention.
Figure 5:
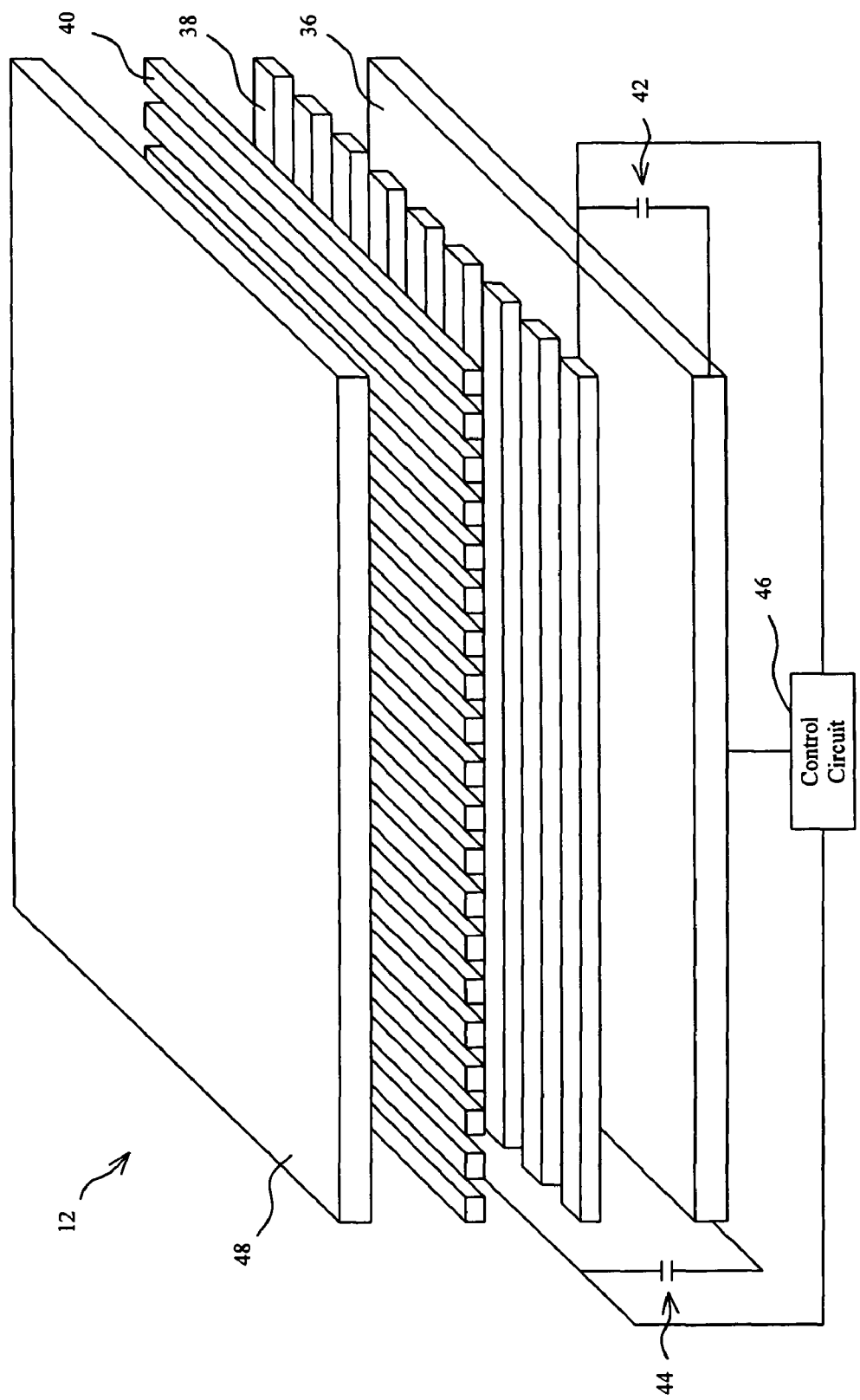
FIG. 5 shows a perspective diagram for illustrating the operational principles of a capacitive touchpad.

FIGS. 3 and 4 are perspective diagrams to show the capacitive touchpad 10 equipped with an additional light source, such that it is advantageous to use for situations with insufficient environmental light. FIG. 3 shows a condition that the panel 12 is made of transparent material such as glass, in which a backlight source 32 is used to project to the panel 12 from the backside thereof in order to illuminate the patterns on the panel 12. In FIG. 4, a frontlight source 34 is used to project to the panel 12 from the frontside thereof in order to illuminate the patterns on the panel 12.

Typically, the patterns for the virtual keys are printed on or attached to the insulation plate 48 of the panel 12. However, other amendments or modifications may be made without departing from the spirit of the present invention illustrated by the embodiments.

All user operations may be achieved without the further need for two devices of a mouse and a keyboard, provided that a capacitive touchpad of the present invention is applied in an electronic apparatus operated on a Windows operating system. Therefore, advantages of small volume and low cost over the electronic apparatus installed with mouse and keyboard may further appear.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A capacitive touchpad comprising:
   a panel;
   a first pattern on the panel, programmed as a mode switch, for being operated to selectively switch the capacitive touchpad between a plurality of operational modes, said operational modes including at least a handwriting input mode and a graphical input mode;
   a plurality of regions programmable on the panel in a manner corresponding to each of the operational modes; and
   a plurality of second patterns in the plurality of regions, programmable in a manner corresponding to each of the operational modes;
   wherein said graphical input mode is independently operable from said handwriting input mode;
   wherein an input trace from said graphical input mode is recognized by a recognition module, said recognition module operating in said graphical input mode to selectively complete the input trace responsive to a command issued by a user;
   wherein said recognition module in said handwriting input mode automatically detects completion of the input trace based on subsequent occurrence of a response time initiated upon a cessation of said input trace for said recognition module to automatically recognize input trace from said handwriting input mode, the response time being selectively adjustable by said user; the recognition module during said handwriting input mode, transmitting said input trace to a display.

2. The touchpad of claim 1, wherein the plurality of operational modes further comprises a key input mode.

3. The touchpad of claim 1, further comprising a display for displaying a data inputted on the panel or a current operational mode.

4. The touchpad of claim 1, further comprising a backlight source at a backside of the panel for illuminating the panel.

5. The touchpad of claim 1, further comprising a frontlight source at a frontside of the panel for illuminating the panel.

6. A mobile phone having a capacitive touchpad thereof, the capacitive touchpad comprising:
- a panel;
- a first pattern on the panel, programmed as a mode switch, for being operated to selectively switch the capacitive touchpad between a plurality of operational modes, said operational modes including at least a handwriting input mode and a graphical input mode;
- a plurality of regions programmable on the panel in a manner corresponding to each of the operational modes; and
- a plurality of second patterns in the plurality of regions, programmable in a manner corresponding to each of the operational modes;
- wherein said graphical input mode is independently operable from said handwriting input mode;
- wherein an input trace from said graphical input mode is recognized by a recognition module, said recognition module operating in said graphical input mode to selectively complete the input trace responsive to a command issued by a user;
- wherein said recognition module in said handwriting input mode automatically detects completion of the input trace based on subsequent occurrence of a response time initiated upon a cessation of said input trace for said recognition module to automatically recognize input trace from said handwriting input mode, the response time being selectively adjustable by said user; the recognition module during said handwriting input mode transmitting said input trace to a display.

7. The mobile phone of claim 6, wherein the plurality of operational modes further comprises a key input mode.

8. The mobile phone of claim 6, further comprising a display for displaying a data inputted on the panel or a current operational mode.

9. The mobile phone of claim 6, further comprising a backlight source at a backside of the panel for illuminating the panel.

10. The mobile phone of claim 6, further comprising a frontlight source at a frontside of the panel for illuminating the panel.

11. The touchpad of claim 1, wherein the plurality of operational modes further comprises a mouse control mode.

12. The mobile phone of claim 6, wherein the plurality of operational modes further comprises a mouse control mode.

* * * * *